United States Patent
Chakrabarty et al.

(10) Patent No.: US 11,423,588 B2
(45) Date of Patent: Aug. 23, 2022

(54) COLOR TRANSFORMS USING STATIC SHADERS COMPILED AT INITIALIZATION

(71) Applicant: Adobe Inc., San Jose, CA (US)

(72) Inventors: Saikat Chakrabarty, Noida (IN); Lars Borg, Kalaheo, HI (US)

(73) Assignee: Adobe Inc., San Jose, CA (US)

(*) Notice: Subject to any disclaimer, the term of this patent is extended or adjusted under 35 U.S.C. 154(b) by 83 days.

(21) Appl. No.: 16/674,446

(22) Filed: Nov. 5, 2019

(65) Prior Publication Data

US 2021/0134024 A1 May 6, 2021

(51) Int. Cl.
*G06T 11/00* (2006.01)
*G06T 1/20* (2006.01)

(52) U.S. Cl.
CPC .......... *G06T 11/001* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 5,764,795 A | 6/1998 | Takeo et al. | |
| 5,881,211 A | 3/1999 | Matumura | |
| 5,943,058 A | 8/1999 | Nagy | |
| 6,362,808 B1 | 3/2002 | Edge et al. | |
| 6,594,388 B1* | 7/2003 | Gindele | H04N 1/6027 358/520 |
| 6,693,644 B1 | 2/2004 | Moriwaki et al. | |
| 7,054,035 B2 | 5/2006 | Zeng et al. | |
| 7,593,021 B1 | 9/2009 | Tynefield et al. | |
| 7,973,802 B1* | 7/2011 | Tynefield, Jr. | G09G 5/363 345/604 |
| 10,051,252 B1* | 8/2018 | Cohen | G06T 5/002 |
| 2004/0190617 A1 | 9/2004 | Shen et al. | |
| 2005/0031199 A1 | 2/2005 | Ben-Chorin et al. | |
| 2005/0219260 A1 | 10/2005 | Satomi et al. | |
| 2006/0012604 A1* | 1/2006 | Seetharamaiah | G06T 15/80 345/582 |
| 2006/0094963 A1 | 5/2006 | Sumanaweera et al. | |
| 2006/0282604 A1 | 12/2006 | Temkine et al. | |
| 2014/0028696 A1 | 1/2014 | Kulkarni | |
| 2014/0298170 A1* | 10/2014 | Mercilie | G11B 27/105 715/716 |
| 2021/0065423 A1* | 3/2021 | Oldcorn | G06T 15/005 |

OTHER PUBLICATIONS

Bjorke, Kevin, Nvidia Developer, "Color Control", GPU Gems, Chapter 22, Sep. 2007, pp. 363-373.

* cited by examiner

*Primary Examiner* — Aaron M Richer
(74) *Attorney, Agent, or Firm* — Kilpatrick Townsend & Stockton LLP

(57) ABSTRACT

A method, in which one or more processing devices perform operations, includes compiling a static shader at initialization of a media-processing application. The static shader is configured to transform color data from multiple pre-transform color spaces to multiple post-transform color spaces. A runtime of the media-processing application occurs subsequent to the initialization, and the method further includes determining, during the runtime, that the static shader is applicable to a color transform from a pre-transform color space to a post-transform color space. The method further includes executing the static shader to perform the color transform, based on determining that the static shader is applicable to the color transform.

18 Claims, 5 Drawing Sheets

COLOR TRANSFORMS USING STATIC SHADERS COMPILED AT INITIALIZATION

TECHNICAL FIELD

This disclosure generally relates to computer graphics. More specifically, but not by way of limitation, this disclosure relates to techniques for efficient color transforms using static shaders compiled at initialization.

BACKGROUND

Conversion between color spaces is a common operation in color-managed media-processing applications. Media, such as video or an image, might be encoded in a different color space than a display color space (e.g., the color space of a display monitor in use). Additionally, users sometimes prefer to set a working color space for editing media content and then to convert from the working color space back to an original color space upon saving the media content. Thus, when working with a single piece of media, multiple color spaces may be used, and conversion from one color space to another may be desired.

For instance, a typical workflow involving media content, specifically high dynamic range (HDR) content, begins with importing the HDR content into a workspace of a media-processing system. The conversion changes the content's color data (i.e., data describing the colors of pixels) from an HDR color space into a working color space, where the media content that was formerly HDR content will be edited.

A graphics processing unit (GPU) is a device useable to perform fast processing of data, particularly data relating to graphics. Existing systems utilize shaders to convert between color spaces in a workflow such as the one described above, where a shader is a type of program code utilized by a GPU to perform color transforms (i.e., conversions). For instance, when converting between color spaces during runtime, an existing system checks an origin color profile (i.e., a color profile describing an origin color space) to determine how to transform color data from a corresponding origin color space (i.e., the color space from which a color transform is desired) to a device-independent color space. The system also checks a destination color profile (i.e., a color profile describing a destination color space) to determine how to transform color data from the device-independent color space to a destination color space (i.e., the color space to which a color transform is desired) corresponding to the destination color profile. Based on the information in the origin color profile and the destination color profile, the existing system compiles a shader to perform an overall color transform from the origin color space to the device-independent color space and from the device-independent color space to the destination color spacers.

The shader is compiled on demand. In other words, the existing system incorporates program code with instructions to construct and compile the shader based on the information in the origin color profile and the destination color profile. Because the specific color spaces involved in the color transform are not known prior to the runtime, the compilation (i.e., transformation into GPU-readable language) of the shader is performed at runtime. During the runtime, the shader is stored in a pipeline state (i.e., an operative state) of the GPU to enable the GPU to utilize the shader to transform color data from the origin color space to the destination color space. Despite the performance improvements potentially provided by the use of a GPU, compiling the shader and establishing the pipeline state on the GPU for that shader is a time-consuming process performed even before utilizing the GPU to perform a color transform.

SUMMARY

In one embodiment, a method, in which one or more processing devices perform operations, includes compiling a static shader at initialization of a media-processing application. The static shader is configured to transform color data from multiple pre-transform color spaces to multiple post-transform color spaces. In one non-limiting example, a media-processing application compiles the static shader during initialization of the media-processing application, such that the static shader represents and applies to a color transform having a particular format that includes a specific sequence of operation types. For instance, the static shader in this example applies to color transforms that each include the following operations, applied in order: a one-dimensional mapping applied to each channel of color data individually, a matrix transformation applied to all channels of the color data, and another one-dimensional mapping applied to each channel of the color data individually.

A runtime occurs subsequent to the initialization, and the method further includes determining, during the runtime, that the static shader is applicable to a color transform from a pre-transform color space to a post-transform color space. Continuing with this example, during the runtime of the media-processing application, a user requests that media be converted from an origin color space, such as a high dynamic range color space, to a working color space used to edit the media. The media-processing application determines that this color transform requires a sequence of operations that match the sequence of operation types of the static shader. The method further includes executing the static shader to perform the color transform, based on determining that the static shader is applicable to the color transform. Specifically, in this example, the media-processing application converts the sequence of operations for the color transform into arguments for the static shader and runs the static shader to perform the color transform from the origin color space to the working color space.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
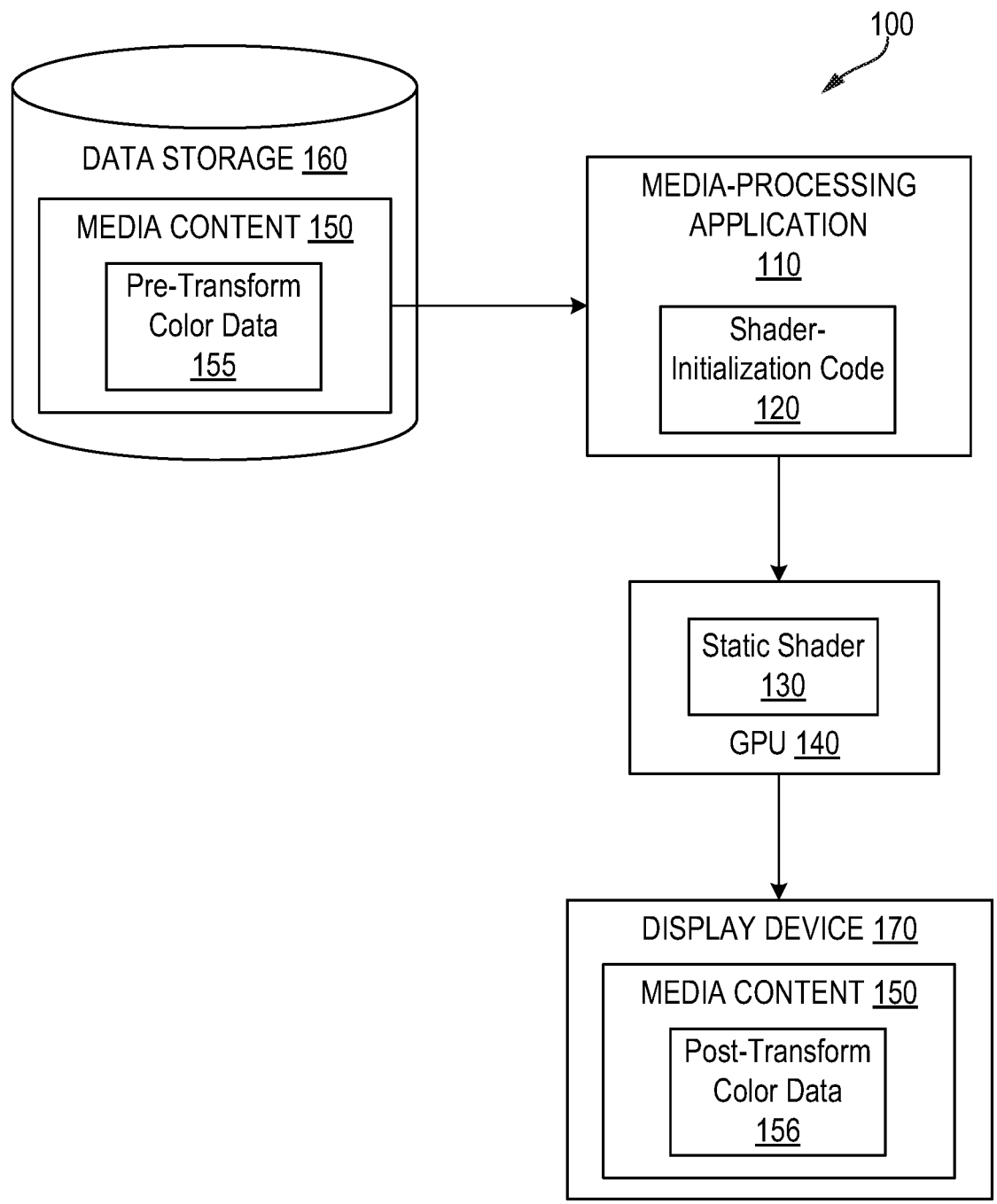
FIG. 1 depicts an example of a conversion system for transforming color data between color spaces, according to certain embodiments of the present disclosure.

Transformation between color spaces requires high performance, especially in the case of transforming high dynamic range (HDR) content or transforming content in real-time such as for display on a monitor. In one example, if a user requests that media content be transformed from an HDR color space into a working color space, the user then waits for the transformation to conclude before beginning to edit the media content. In another example, when making an edit to media content in the working color space, the user typically waits for the edit to be displayed, which may require a transformation between the working color space and a color space for a display monitor, before making another edit. Thus, in both cases, the efficiency of color transforms can dramatically impact user experience. In existing computing systems, that performance is negatively impacted by the time and resources required to generate and compile a shader and to set up a pipeline state on the GPU for that shader on demand during runtime. This leads to performance bottlenecks, especially in the case of HDR color data.

Some graphics processing units (GPUs) enable the use of static shaders that are compiled only once; however, because it is unknown in advance which color transforms will be necessary during runtime, and because a shader typically needs to be tailored to both the origin color space and the destination color space, it is not practical to compile static shaders in advance for executing color transforms. For instance, the compilation of every possible static shader, each converting from one specific color space to another specific color space, would require the use of valuable GPU storage space that cannot practically be sacrificed. Thus, existing systems continue to compile shaders for color transforms at runtime, when the origin color space and the destination color space become known.

The present disclosure includes systems and methods for efficient color transforms (i.e., conversions) using static shaders compiled at initialization time, rather than at runtime. As explained above, conventional techniques that rely on runtime compilation of shaders may suffer reduced performance (e.g., delays in responsiveness to user commands). Embodiments described herein can leverage the ability of a GPU to maintain static shaders, thereby reducing or avoiding these performance problems. For example, certain embodiments use a small set of static shaders strategically designed to represent a predetermined set of color transforms, such that a particular static shader is useable for multiple color transforms. As such, when a color transform is needed during runtime, a corresponding static shader has been previously compiled and thus need not be compiled during runtime.

The following non-limiting example is provided to introduce certain embodiments. In this example, a media-processing application includes, in its program code, instructions describing a small set of static shaders (e.g., four static shaders), each static shader representing a color transform having a particular format that includes a specific sequence of operation types. Further, in this example, one such static shader represents, and thus applies to, color transforms that each include a one-dimensional mapping applied to each channel of color data individually, a matrix transformation applied to all channels of the color data, and another one-dimensional mapping applied to each channel of the color data individually, where the static shader is independent of which specific one-dimensional mappings and matrix are needed for the color transforms. For instance, the static shader includes machine-readable instructions that tell the GPU to perform the following operations on each color coordinate in a given media content: (1) receive the color coordinate; (2) for each of the three channels, map the value of the color coordinate in that channel to a corresponding value using a first one-dimensional mapping that will be provided; (3) store the results of the first one-dimensional mappings of the three channels to a second color coordinate; (4) use matrix multiplication to multiply the second color coordinate by a matrix that will be provided; (5) store the result of the matrix multiplication to a third color coordinate; (6) for each of the three channels, map the value of the third color coordinate in that channel to a corresponding value using a second one-dimensional mapping that will be provided; and (7) output the results of the second one-dimensional mapping of the three channels as a fourth color coordinate. This example of a static shader does not explicitly specify the first one-dimensional mapping, the matrix, or the second one-dimensional mapping; rather, the static shader expects parameters that specifically define the first one-dimensional mapping, the matrix, or the second one-dimensional mapping.

As described in detail below, the static shaders are generalized in that each static shader represents a respective format (i.e., a sequence of operation types such as one-dimensional mappings and matrices), but is not tailored to a particular transform from one specific color space to another. At initialization of the media-processing application, the static shaders are compiled based on the program code in the media-processing application. Each such static shader, as compiled, is stored in a corresponding pipeline state of a GPU on the computing device running the media-processing application. Each such pipeline state includes its corresponding static shader as well as, for instance, hardware settings telling the GPU how to process information such as color data. Thus, at initialization, the media-processing application establishes a respective pipeline state on the GPU for each static shader, thereby utilizing each such pipeline state as an operative state that includes information about how the GPU should process color data using each static shader.

Continuing with this example, during runtime of the media-processing application, a user requests that media be converted from an origin color space, such as an HDR color space, to a destination color space, such as a working color space used to edit the media. High-dynamic-range imaging (HDRI), which produces HDR color data, provides a similar range of luminance as experienced through the human visual system. But this HDR color data may be difficult to edit directly if, for example, a display monitor of a computing device is incapable of displaying the HDR color data. Thus, converting media from an HDR color space to a working color space suitable for the display monitor can allow the media to be edited using the computing device.

In this example, the media-processing application responds to receiving the request to convert the media between color spaces by determining how to transform color data from the HDR color space into color data from the working color space. In some embodiments, the media-processing application does so using the respective International Color Consortium (ICC) profiles of the HDR color space and the working color space. The ICC is a standardization effort that defines standard requirements for a color profile (i.e., a specification of a color space). In compliance with ICC specifications, a color profile defines a conversion of color data to and from a corresponding color space to a device-independent color space, such as one describing luminance or tristimulus values. In the current example, the media-processing application determines, from the ICC color profiles, an ordered sequence of operations that equate to the desired color transform.

In this example, the ordered sequence of operations needed to perform the color transform are a specific first one-dimensional mapping, a specific matrix, and a specific second one-dimensional mapping. The media-processing application selects a particular static shader for use by comparing this sequence of operations to the set of static shaders to determine which of the static shaders has a format (i.e., an ordered sequence of operation types) matching the format of the color transform, such that the ordered sequence of operation types in the static shader aligns with the ordered sequence of specific operations in the color transform. In this case, the set of static shaders compiled during initialization includes a static shader representing a first one-dimensional mapping, a matrix, and a second one-dimensional mapping. Thus, this static shader is selected for us.

To perform the color transform, the media-processing application constructs a texture, which is a type of a data structure used by a GPU, corresponding to each operation in the sequence of operations needed for the color transform. The media-processing application binds the static shader to a corresponding texture representing each specific operation needed in the color transform. Typically, a texture is an appearance of a graphical object. In some embodiments, however, operations are encoded as textures to enable such operations to be passed to static shaders as parameters (i.e., arguments) in the manner in which a texture can be traditionally bound to an asset. Binding is an operation available in various programming languages that results in a data structure (e.g., a texture) being used as a parameter. Thus, for instance, by binding the static shader to a texture representing the specific first one-dimensional mapping, the static shader knows to use that specific one-dimensional mapping as a parameter when running. During runtime, the pipeline state need not be set up (i.e., established on the GPU) and the corresponding static shader need not be compiled, because the pipeline state incorporating the static shader was previously established on the GPU during initialization of the media-processing application. The media-processing application instructs the computing device to transform the media to the working color space in the pipeline state corresponding to the selected static shader, and thus, the GPU processes the media in that pipeline state. In this manner, the GPU is used to transform color data of pixels from the media into color in the working color space.

Certain embodiments described herein provide an improvement in the field of media editing, specifically in the area of color transforms, and further provide in improvement in GPUs themselves. For instance, by compiling specific static shaders designed to represent a set of color transforms, a media-processing application can avoid compiling a shader during runtime. Avoiding this runtime compilation can prevent delays in processing commands from being noticeable to a user of the media-processing application. According to some embodiments, static shaders are compiled once, during initialization, rather than as needed during each runtime; analogously, pipeline states in the GPU are set up once, during initialization, rather than as needed during each runtime. This can result in significant increases in efficiency, because these time-consuming operations need not be performed repeatedly or during runtime, without a decrease in accuracy. Further, embodiments described herein require the use of a particular machine, specifically, a GPU capable of supporting static shaders. The static shaders described herein are stored in pipeline states on a GPU for use during runtime. Doing so can result in an improved GPU capable of processing color transforms more efficiently than a conventional GPU that lacks such static shaders and pipeline states.

Example of Using a Conversion System to Perform Color Transforms with Static Shaders Referring now to the drawings, FIG. 1 depicts an example of a conversion system 100 configured to perform color transforms, according to certain embodiments of the present disclosure. The arrows shown in FIG. 1 illustrate directions of example communication flows; however, it will be understood that such arrows do not limit the various embodiments described herein. As shown in FIG. 1, an example of the conversion system 100 includes a media-processing application 110, such as Adobe® After Effects or Adobe Premiere. An embodiment of the media-processing application 110 includes shader-initialization code 120, which is executable to compile one or more static shaders 130 for storage on a GPU 140.

In some embodiments, during initialization of the media-processing application 110, the media-processing application 110 utilizes the shader-initialization code 120 to compile a static shader 130 configured to perform multiple color transforms. An example of the static shader 130 is profile-agnostic in that the static shader 130 can be utilized to transform color data from multiple pre-transform color spaces to multiple post-transform color spaces without requirement that a particular color space, or color profile, be involved. In some embodiments, during the initialization, a GPU 140 stores the static shader 130 for later use.

At runtime, an embodiment the media-processing application 110 retrieves media content 150 from data storage 160 on a computing system. The media content 150 includes pre-transform color data 155, which is color data in a pre-transform color space (i.e., an origin color space from which the color data will be transformed). For instance, the color data may be HDR color data. During runtime, such as at the request of a user, the media-processing application 110 seeks to transform the color data from the pre-transform color space to a specific post-transform color space (i.e., a destination color space to which the color data will be transformed). To this end, the media-processing application 110 determines whether the static shader 130 that was compiled during initialization is applicable to a color transform from the pre-transform color space to the post-transform color space.

If the static shader 130 is deemed applicable, an embodiment of the media-processing application 110 requests that the GPU 140 execute the static shader 130 to perform the color transform. In some embodiments, the media content 150 is then displayed on a display device 170, or provided via some other output device. After the color transform, the media content 150 as displayed on the display device 170 includes post-transform color data 156, which is color data in the post-transform color space.

Figure 2:
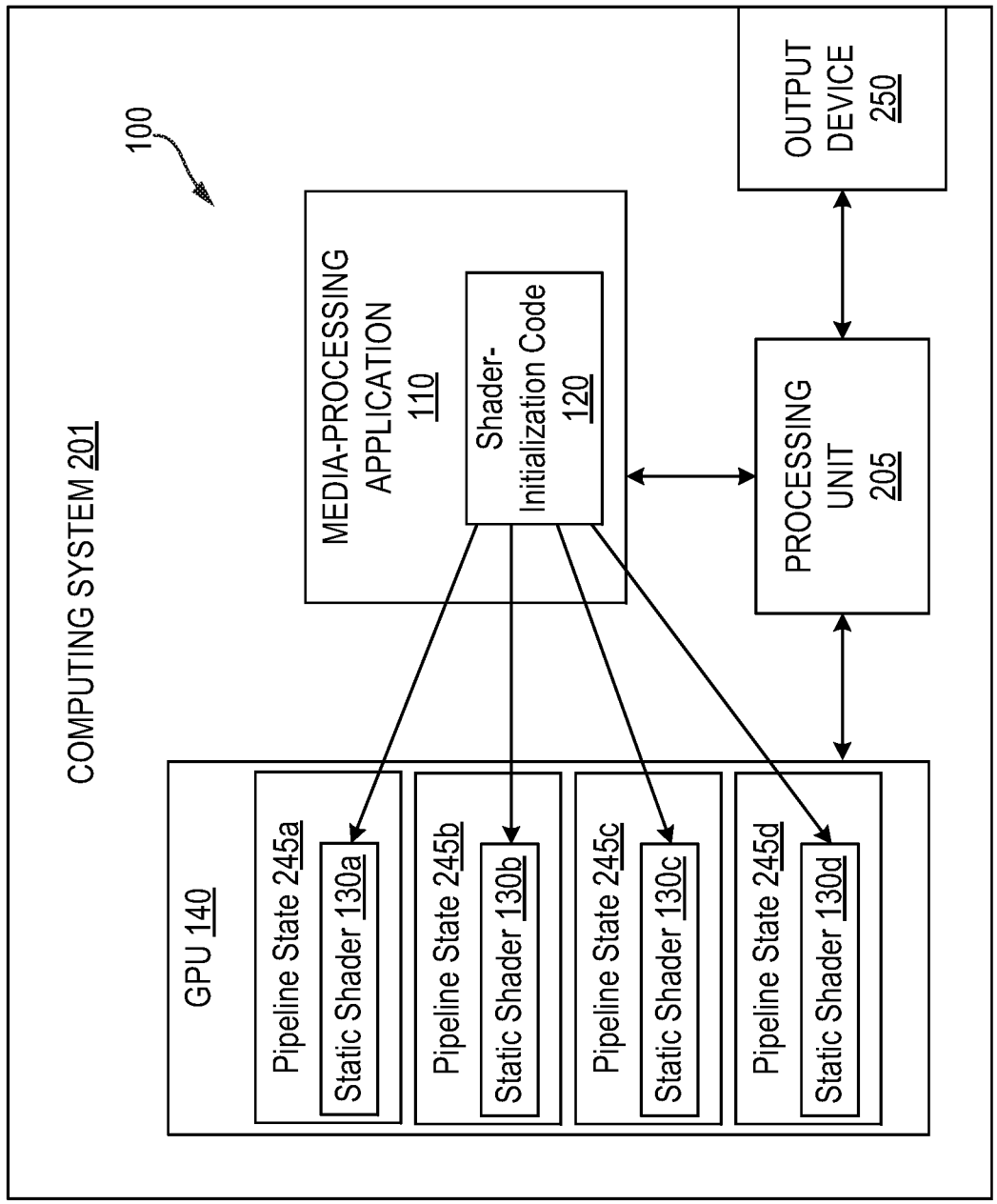
FIG. 2 depicts an example of a conversion system running on an example computing system and configured to perform color transforms, according to certain embodiments of the present disclosure.

FIG. 2 depicts an example of a conversion system 100 running on an example computing system 201 and configured to perform color transforms, according to certain embodiments of the present disclosure. The arrows shown in FIG. 2 illustrate directions of example communication flows; however, it will be understood that such arrows do not limit the various embodiments described herein. As shown in FIG. 2, an example of the conversion system 100 includes a media-processing application 110 executable by one or more processing units 205 of a computing system 201, such as a computing device. The media-processing application 110 is configured for processing (e.g., editing) media, such as video or images.

In some embodiments, shader-initialization code 120 is program code incorporated into the media-processing application 110 indicating a set of static shaders 130a, 130b, 130c, and 130d. The shader-initialization code 120 enables the media-processing application 110 to compile the static shaders 130 during initialization of the media-processing application 110. More specifically, the shader-initialization code 120 is executed by a processing unit 205 of the computing system 201 on behalf of the media-processing application 110 to compile the static shaders 130. A GPU 140 installed on, or otherwise useable by, the computing system 201 stores the static shaders 130 during initialization and later utilizes the static shaders 130 during runtime to process graphical data, such as color data. In some embodiments, the computing system 201 further includes an output device 250, such as a display monitor or a printer, configured to display graphical data that has been processed by the GPU 140.

In some embodiments, the static shaders 130 are profile-agnostic. In other words, the static shaders 130 are designed to represent a set of color transforms, such that each static shader 130 can be used to perform color transforms from multiple color spaces to multiple color spaces. For instance, a single static shader could handle color transforms from any of one set of color spaces to any of another set of color spaces, rather than being limited to a single color transform from a first specific color space to a second specific color space. Examples of the static shaders 130 are described in detail below.

In some embodiments, the various static shaders 130 are used for performing transforms from one Red-Green-Blue (RGB) color space to another RGB color space. Additionally or alternatively, however, the static shaders 130 are used for transforming to or from Hue-Saturation-Lightness (HSV), Cyan-Magenta-Yellow-Key (CMYK), CIELAB, YCC, or other color spaces. In some embodiments, during initialization, the media-processing application 110 compiles one or more of these static shaders 130 and saves each such static shader 130 in a respective pipeline state 245a, 245b, 245c, or 245d (collectively 245) of the GPU 140. Generally, a pipeline state 245 is an operative state of the GPU 140 that maintains hardware settings for processing graphical data, such as color data. The use of pipelines states 245 enables the GPU 140 to quickly switch between settings by switching between pipeline states 245 in which instructions run.

In one example, during initialization, the media-processing application 110 compiles a set of four static shaders 130 including a first static shader 130a, a second static shader 130b, a third static shader 130c, and a fourth static shader 130d. In some embodiments, initialization occurs prior to runtime of the media-processing application 110. For instance, initialization occurs directly after installation of the media-processing application 110 onto the computing system 201 or the first time the media-processing application 110 runs on the computing system 201. During initialization, the media-processing application 110 can define global variables that will persist across various future runtimes. In this example, compilation of static shaders 130 occurs prior to the media-processing application 110 opening or editing media, when the media-processing application 110 is not yet useable by a user.

In some embodiments, during a runtime of the media-processing application 110, the media-processing application 110 receives a request to transform color data to or from a working color space, or the media-processing application 110 is expected to display data in a display color space corresponding to an output device 250, potentially in real time. For example, media could be captured by way of HDRI and thus provided to the media-processing application 110 in HDR color data (i.e., in an HDR color space). In this example, however, the display monitor in use is not capable of displaying the full gamut of HDR data, and thus, a user may choose to edit the media in a color space with a reduced color gamut that can be faithfully displayed through the display monitor. Upon instruction from the user, the media-processing application 110 transforms the HDR data to another color space, one that can be accurately presented on the display monitor. As such, the user can be confident that the user's edits are having the desired impact on the media because such edits are faithfully presented on the display monitor. For one of these or other reasons, the media-processing application 110 seeks to transform color data between color spaces in an efficient manner. The media-processing application 110 uses one or more static shaders 130 compiled at initialization to do so.

A transform from one color space to another color space involves a sequence of operations that are specified in corresponding color profiles of the color spaces. For instance, a color profile of a pre-transform color space identifies or otherwise indicates a set of operations that change a first set of RGB values, which represent colors in the pre-transform color space, into a second set of RGB values, which represent those colors in a second color space. The second color space could be a device-independent color space, such as the Profile Connections Space (PCS). In this example, a color profile of a post-transform color space identifies or otherwise indicates a set of operations that change the second set of RGB values (e.g., RGB values for the device-independent color space) into a third set of RGB values, which represent the colors in the post-transform color space. Thus, by checking indications in a pre-transform color profile of a pre-transform color space and indications in a post-transform color profile of a post-transform color space, the media process application 110 can determine which operations are required to convert color data from the pre-transform color space to the device-independent color space and to convert from the device-independent color space to the post-transform color space. In combination, this pair of conversions implements a transform from the pre-transform color space to the post-transform color space.

In one example, color transforms between RGB color spaces can be generalized as a combination of ten operations applied in the following sequence: {1D, 3D, 1D, Matrix, 1D, 1D, Matrix, 1D, 3D, 1D}. The sequence of operations acts as a formula for calculating color data in a post-transform color space from the starting point of color data in a pre-transform color space. In some color transforms, not every operation of this formula is necessary, and in that case, that operation can be replaced by a "no-op" (i.e., a "NULL" instruction indicating that no operation should occur) replaces that operation. An embodiments of the media-processing application 110 utilizes profile-agnostic static shaders 130 capable of performing one or more such operations to execute color transforms.

The first five operations (i.e., 1D, 3D, 1D, Matrix, 1D), which are described in more detail below, convert the color data from a pre-transform color space to a device-independent color space. In some embodiments, these five operations can be used to convert each existing RGB color space associated with a color profile to a device-independent space. The color profile of the pre-transform color space indicates which specific one-dimensional (1D) curves, three-dimensional (3D) lookup tables (LUTs), and matrices to use for each of the above. In some cases, color transforms require a level of complexity that cannot be achieved with simply a matrix or simply a 1D curve. Multiple operations, such as the sequence of five operations above, in sequence may be necessary. With these five operations, however, an arbitrary RGB color space can be transformed to another arbitrary RGB color space. In certain cases, however, a color profile could indicate that an operation in the above is not needed (e.g., in the case where the conversion to or from the corresponding color space is not complex enough to require all five operations), in which case a no-op replaces that operation.

In the set of ten operations identified above, the first operation involves using a 1D curve to convert first color data into second color data. The 1D curve includes a set of (x, y) value pairs. As a simplified example, the x value represents a particular value in a first color space, such as a certain value for a "red" channel in a set of RGB color values within a pre-transform color space, and the y value represents a corresponding value in a second color space, such as a different value for the "red" channel within a destination color space. Examples of a 1D curve include a 1D parametric curve, where a color value in the second color space is computed from a parametric function of a color value from the first color space, and a 1D LUT, in which color values sampled from the first color space are associated with corresponding color values sampled from the second color space.

In the first operation, a single 1D curve is applied to the value in each dimension of the color spaces, or a respective 1D curve is applied for each dimension to the value in that dimension. For instance, the 1D curve is used to convert color values in the "red" dimension of the first color space to color values in the "red" dimension of the second color space, the same 1D curve is used to convert color values in the "green" dimension of the first color space to color values in the "green" dimension of the second color space, and the same 1D curve is used to convert color values in the "blue" dimension of the first color space to color values in the "blue" dimension of the second color space. Thus, the result of applying the 1D curve is a shift in the values across three dimensions of color. The second color data is generated as an intermediate activity in the process of converting from the pre-transform color space to the device-independent color space.

Returning to the set of ten operations identified above, the second operation involves applying a 3D LUT to the three dimensions of the second color data to generate third color data. For example, a 3D LUT is a table in which a color having a value in each of three channels (e.g., red, green, and blue) in a first color space is mapped to another color having three channels in a second color space. In other words, a coordinate of three color channels in the first color space maps to a coordinate of three color channels in the second color space. In one example, given a pixel having RGB values of (210, 150, 10), the conversion system 100 could look up the input value (210, 150, 10) in the 3D LUT to determine a three-dimensional output value, such as (180, 160, 5), to which the input value (210, 150, 10) maps. The three-dimensional output value becomes the value of the pixel in the third color data. Thus, using a 3D LUT, the third color data is determined based on the second color data. Although the third color data may not have a practical meaning in itself, the transition from the second color data to the third color data is performed as an intermediate activity in the process of converting from the pre-transform color space to the device-independent color space.

In the third operation, a single second 1D curve is applied to each dimension of the third color data, or a respective second 1D curve is applied for each dimension to the value in that dimension, to generate fourth color data. The second 1D curve can differ from the first 1D curve discussed above in that, given an x value, the resulting y value output by the second 1D curve can differ from the resulting y value if the first 1D curve were applied. As mentioned above, a color transform can be a complex process involving a sequence of operations, and in some cases, as would be indicated in the applicable color profiles, multiple 1D curves may be applicable at different points in that process. The fourth color data is generated as an intermediate activity in the process of converting from the pre-transform color space to the device-independent color space.

In the fourth operation, a matrix is applied to the three dimensions of the fourth color data to generate fifth color data. For example, given a color coordinate having three dimensions in the fourth color data, that color coordinate is multiplied by a matrix using matrix multiplication to produce another color coordinate that is part of the fifth color data. In one example, the matrix is a 3-by-3 matrix. In another example, however, the matrix is a 3-by-4 matrix that combines a 3-by-3 matrix with a 3-by-1 matrix acting as an offset, such that offset is added to the result of the matrix multiplication. This matrix multiplication is applied to each color coordinate in the fourth color data to provide the fifth color data. In some cases, the fifth color data is in a color space similar to the desired device-independent color space but with the color values shifted, thus resulting in a shifted version of the device-independent color space. The fifth color data is generated as an intermediate activity in the process of converting from the pre-transform color space to the device-independent color space.

In the fifth operation, a single third 1D curve is applied to different dimensions of the fifth color data, or a respective third 1D curve is applied for each dimension to the value in that dimension, to generate sixth color data. The third 1D curve can differ from the first and second 1D curves discussed above in that, given an x value, the resulting y value output by the third 1D curve can differ from the resulting y value if the first or second 1D curve were applied. As mentioned above, a color transform can be a complex process involving a sequence of operations, and in some cases, as would be indicated in the applicable color profiles, multiple 1D curves may be applicable at different points in that process. Generally, the 1D curve in the fifth operation provides a final shift of values that brings the fifth color data into the device-independent color space. For instance, the sixth color data is a device-independent color space such as PCS.

The remaining five operations (i.e., 1D, Matrix, 1D, 3D, 1D) convert from the device-independent color space to the post-transform color space. For example, these last five operations convert the color data from the device-independent color space to a post-transform color space associated with the post-transform color profile. These five operations can be used to convert color data from the device-independent color space to each existing RGB color space associated with a color profile. The post-transform color profile indicates which specific 1D curves, 3D LUTs, and matrix to use for each of the above. In some cases, the post-transform color profile could indicate that an operation in the above is not needed, in which case a no-op replaces that operation.

In the sixth operation, a single fourth 1D curve is applied to each dimension of the sixth color data (i.e., in the device-independent color space), or a respective fourth 1D curve is applied for each dimension to the value in that dimension, to result in seventh color data. The fourth 1D curve can differ from the first, second, and third 1D curves discussed above in that, given an x value, the resulting y value output by the fourth 1D curve can differ from the resulting y value if the first, second, or third 1D curve were applied. As mentioned above, a color transform can be a complex process involving a sequence of operations, and in some cases, as would be indicated in the applicable color profiles, multiple 1D curves may be applicable at different points in that process. In some cases, the seventh color data is in a color space similar to the device-independent color space but with the color values shifted, thus resulting in a shifted version of the device-independent color space. The seventh color data is generated as an intermediate activity in the process of converting from the device-independent color space to the post-transform color space.

In the seventh operation, a second matrix is applied to the three dimensions of the seventh color data to result in eighth color data. For example, given a color coordinate having three dimensions in the seventh color data, that color coordinate is multiplied by a matrix (e.g., a 3-by-3 matrix) using matrix multiplication to produce another color coordinate that is part of the eighth color data. This matrix multiplication is applied to each color coordinate in the seventh color data to provide the eighth color data. The eighth color data is generated as an intermediate activity in the process of converting from the device-independent color space to the post-transform color space.

In the eighth operation, a single fifth 1D curve is applied individually to each of the three dimensions of the eighth color data, or a respective fifth 1D curve is applied for each dimension to the value in that dimension, to result in ninth color data. The fifth 1D curve can differ from the previous 1D curves of the sequence as discussed above in that, given an x value, the resulting y value output by the fifth 1D curve can differ from the resulting y value if one of the previous 1D curves were applied. As mentioned above, a color transform can be a complex process involving a sequence of operations, and in some cases, as would be indicated in the applicable color profiles, multiple 1D curves may be applicable at different points in that process. The ninth color data is generated as an intermediate activity in the process of converting from the device-independent color space to the post-transform color space.

In the ninth operation, a second 3D LUT is applied to the three dimensions of the ninth color data to result in tenth color data. As described above, an example of a 3D LUT is a table in which a color having a value in each of three channels (e.g., red, green, and blue) in a first color space is mapped to another color having three channels in a second color space. The second 3D LUT can differ from the first 3D LUT above in that, given a three-dimensional color coordinate (e.g., an input pixel value), the resulting output three-dimensional color coordinate can differ from the output color coordinate if the first 3D LUT were applied. As mentioned above, a color transform can be a complex process involving a sequence of operations, and in some cases, as would be indicated in the applicable color profiles, multiple 3D LUTs may be applicable at different points in that process. The tenth color data is generated as an intermediate activity in the process of converting from the device-independent color space to the post-transform color space.

In the tenth operation, a single sixth 1D curve is applied to each dimension of the tenth color data, or a respective sixth 1D curve is applied for each dimension to the value in that dimension, to result in eleventh color data, which is in the post-transform color space. The fifth 1D curve can differ from the previous 1D curves of the sequence as discussed above in that, given an x value, the resulting y value output by the fifth 1D curve can differ from the resulting y value if one of the previous 1D curves were applied. As mentioned above, a color transform can be a complex process involving a sequence of operations, and in some cases, as would be indicated in the applicable color profiles, multiple 1D curves may be applicable at different points in that process. In some embodiments, the eleventh color data is in the desired post-transform color space, and thus, the color transform is complete upon obtaining the eleventh color data.

The operation types of the above operations can be embodied into one or more static shaders 130 that are profile-agnostic (i.e., not tailored to specific color profiles). In other words, an example of a static shader 130 includes code for operations types and the order of such operation types (e.g., a 1D curve followed by a three-by-three matrix operation) without requiring specific operations (e.g., a certain 1D curve followed by a certain three-by-three matrix needed for a specific color transform). Using static shaders 130 can allow a media-processing application to avoid compiling (i.e., converting into a language readable by the GPU 140) a shader tailored specifically to transform color data from a pre-transform color space to a post-transform color space, based on information in the corresponding ICC color profiles, after identifying the pre-transform color space and the post-transform color space at runtime.

Figure 3:
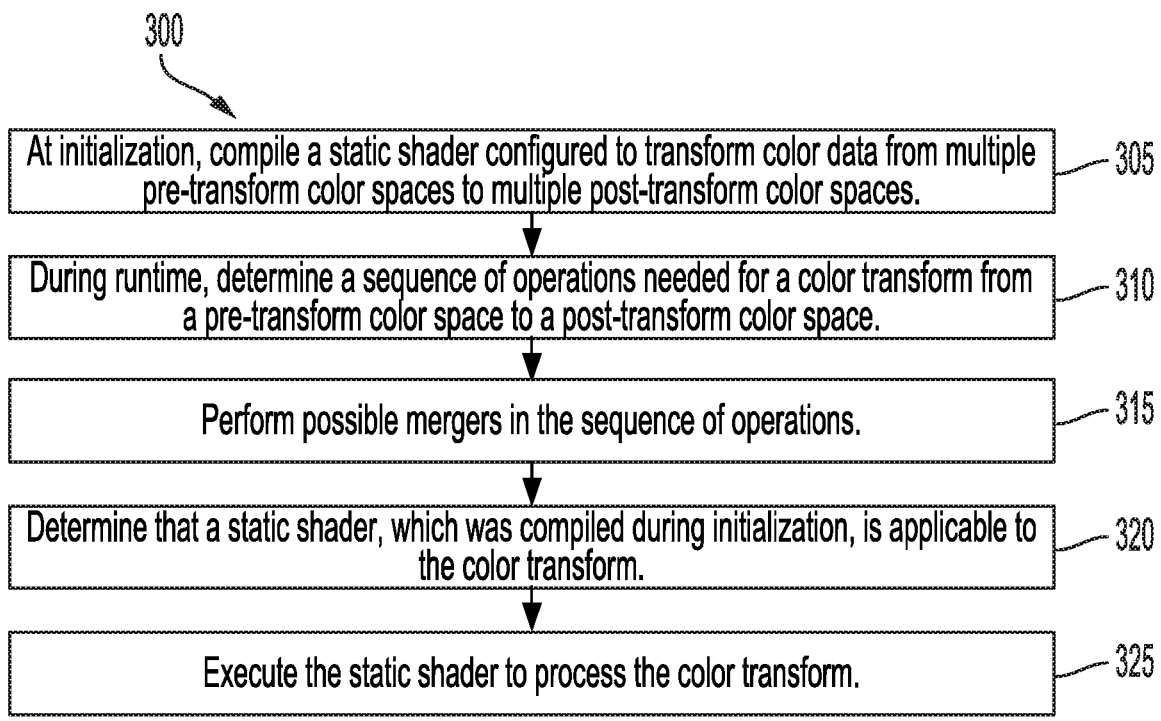
FIG. 3 depicts an example of a process for transforming color data from a pre-transform color space to a post-transform color space, according to certain embodiments of the present disclosure.

FIG. 3 depicts an example of a process 300 for using one or more static shaders 130 to transform color data from a pre-transform color space (i.e., an origin color space) associated with a pre-transform color profile to a post-transform color space (i.e., a destination color space) associated with a post-transform color profile, according to certain embodiments of the present disclosure. In some embodiments, this process 300 or a similar process is executed by a computing system 201, such as by a media-processing application 110 running on the computing system 201. More specifically, the media-processing application 110 includes instructions executable by a processing unit 205 of the computing system 201 to cause the processing unit 205 to perform operations described herein on behalf of the media-processing application 110.

In some embodiments, prior to the beginning of the process 300, program code implementing the media-processing application 110 includes instructions for compiling one or more static shaders 130 at initialization of the media-processing application 110. In one example, the instructions of the media-processing application 110 implement four static shaders 130 configured to transform color data between RGB color spaces associated with (e.g., described in) corresponding color profiles (e.g., ICC profiles). These color profiles identify or otherwise indicate operations used for transforming color data from a device-dependent color space to a device-independent color space, or vice versa. For instance, during development of the media-processing application 110, the instructions for compiling the static shaders 130 are incorporated into the media-processing application 110 as program code.

As shown in FIG. 3, block 305 of the process 300 involves compiling, at initialization of the media-processing application 110, a static shader 130 configured, after compilation, to transform pixels from multiple pre-transform color spaces to multiple post-transform color spaces. To compile the static shader 130, an embodiment of the media-processing application 110 compiles shader-initialization code 120 by transforming the shader-initialization code 120 into a machine-readable language that the GPU 140 can read and use. The media-processing application 110 provides the static shader 130, as compiled, to the GPU 140 for storage in association with a pipeline state 140. In some embodiments, after compilation, the static shader 130 is profile-agnostic and is configured to transform the color data of pixels without requirement that a specific color profile be involved.

In some embodiments, the static shader 130 is configured to transform color data of pixels between RGB color spaces, specifically, for instance, from any RGB color space supported by the media-processing application 110 or by the computing system 201 to any other RGB color space supported by the media-processing application 110 or by the computing system 201. Additionally or alternatively, the media-processing application 110 compiles a set of one or more static shaders 130, which, as a group, can transform color data between all pairs of supported RGB color spaces. For instance, one static shader 130 can be used to transform color data from a first RGB color space to a second RGB color space, while another static shader 130 can be used to transform color data from a first RGB color space to a third RGB color space, such that all possible color transformations between RGB color spaces are supported by the set of static shaders 130.

As shown in FIG. 3, block 310 of the process 300 involves determining, during a runtime of the media-processing application, a sequence of operations required to perform a color transform from a pre-transform color space to a post-transform color space. For instance, the media-processing application 110 retrieves the color profiles respectively associated with the pre-transform color space and the post-transform color space. In one example, the color profiles are stored on the computing system 201 and accessible by the media-processing application 110. In another example, the color profiles are stored remotely, and the media-processing application 110 includes instructions indicating the location of the color profiles. The media-processing application 110 uses the retrieved color profiles to determine the sequence of operations for the color transform.

In particular, as described above, each color profile describes the specific operations, as well as the ordering of such operations, needed to convert color data from the color space corresponding to the profile to a device-independent color space as well as the specific operations needed to convert color data from the device-independent color space to the color space corresponding to the color profile. For instance, the pre-transform color profile associated with the pre-transform color space could indicate a first sequence of operations (e.g., the specific first 1D curve, specific 3D LUT, specific second 1D curve, specific matrix, and specific third 1D curve) needed to convert color data from the pre-transform color space to PCS or some other device-independent space. Further, the post-transform color profile could indicate a second sequence of operations (e.g., the specific first 1D curve, specific matrix, specific second 1D curve, specific 3D LUT, and specific third 1D curve) needed to convert color data from PCS or some other device-independent color space to the post-transform color space.

At block 310, the media-processing application 110 combines, in order, the first sequence of operations with the second sequence of operations. Combining these sequences results in a sequence of operations for the complete color transform from the pre-transform color space to the post-transform color space.

Block 315 of the process 300 involves optionally performing, during the runtime, one or more mergers that are possible in the sequence of operations required for the color transform, if any such mergers are possible. In one example, if the sequence of operations includes two adjacent 1D curves (e.g., parametric or sampled), the media-processing application 110 merges the adjacent 1D curves, such as by using the technique described in the following paragraphs. Additionally or alternatively, in another example, if the sequence of operations includes two adjacent matrices, the media-processing application 110 multiplies the matrices together to merge the matrices into a single matrix. In some embodiments, the static shaders 130 already incorporate potential mergers. Thus, performing these mergers on the sequence of operations determined at block 310 can align the format of the sequence of operations determined at block 310 with the format (i.e., a sequence of operation types) of one or more of the static shaders 130 that are compiled at block 305.

In some embodiments, the conversion system 100 merges adjacent operations in some cases to improve efficiency of a color transform. For instance, a merged 1D curve may require a single interpolation step to use, which is more economical than performing two separate interpolation steps with respect to two separate 1D curves. Thus, the media-processing application 110 can improve the performance of a color transform through using a merged 1D curve as compared to using separate 1D curves.

Figure 4:
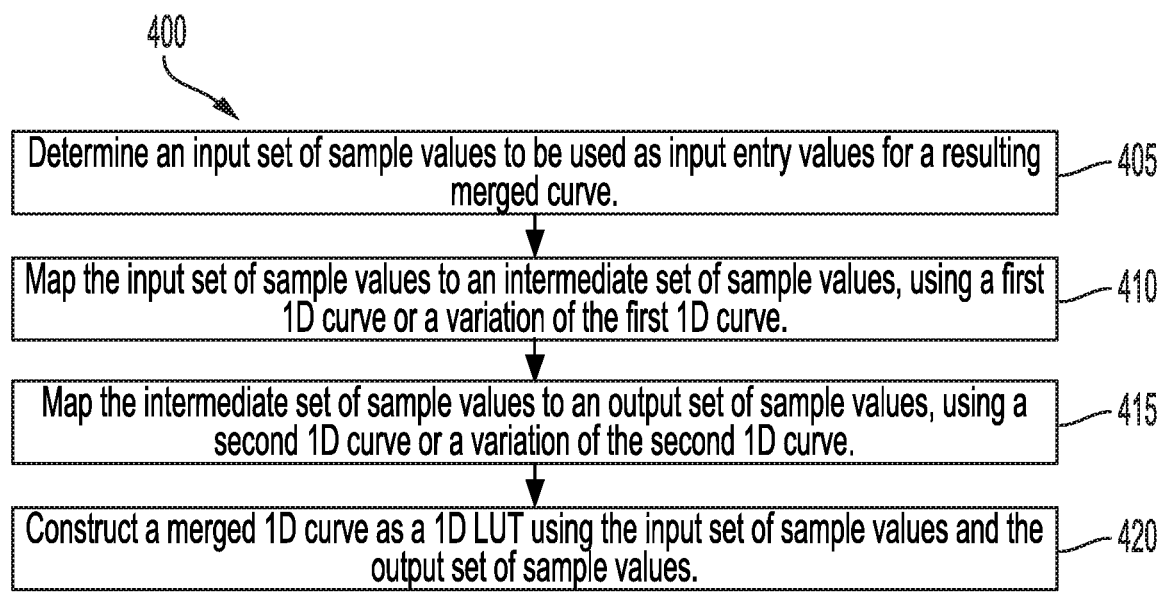
FIG. 4 is a flow diagram of a process of merging two one-dimensional curves, such as could be performed during a color transform, according to certain embodiments of the present disclosure.

FIG. 4 is a flow diagram of a process 400 of merging two 1D curves into a merged 1D curve, according to some embodiments. In some embodiments, this process 400 or similar may be used when sequence of operations for transforming color data includes one 1D curve (e.g., a first 1D LUT) for converting color data that is performed directly before another 1D curve (e.g., a second 1D LUT); in that case, the two 1D curve operations can be merged together to generate a single merged 1D curve. The merged 1D curve can be used to compute the same transformed color data that would result from performing a first color-transformation operation with the first 1D curve followed by a second color-transformation operation with the second 1D curve. In various embodiments, this technique for merging 1D curves can be applied to two parametric curves, two sampled curves, or a combination of a parametric curve and a sampled curve. Further, this technique of merging 1D curves can be extended to three or more adjacent 1D curves, such as by merging two adjacent 1D curves and then merging the result with yet another adjacent 1D curve, until the three or more adjacent 1D curves have been merged into a single 1D curve.

In a non-limiting example, two 1D curve operations involving a first 1D curve, specifically Curve A, and a second 1D curve, specifically Curve B, can be merged to create a third 1D curve, Curve C. If Curve A is defined as $Y_A = f_A(X_A)$ and Curve B is defined as $Y_B = f_B(X_B)$, then the resulting Curve C is defined as $Y_C = f_B'(f_A'(X_C))$. In some embodiments, Curve C is a sampled curve, and Curve A or Curve B, or both, could be sampled curves as well.

As shown in FIG. 4, at block 405, the process 400 includes determining an input set of sample values to be utilized as input entry values for a resulting sampled 1D curve (i.e., a 1D LUT) that will be the resulting merged 1D curve. For instance, an embodiment of the media-processing application 110 selects m sample values, i.e., values of $X_C = X_{C,1} \ldots X_{C,m}$, that will be the x values (i.e., the input entry values) for Curve C. The set of $X_C$ sample values can be selected in any suitable manner. In some embodiments, the media-processing application 110 selects the $X_C$ sample values randomly over the input domain of the first 1D curve, Curve A in this example, where the samples can include overrange values, as described below. In additional or alternative embodiments, the media-processing application 110 selects the $X_C$ sample values such that certain samples are more concentrated within the range corresponding to the pre-transform color space, which will be known at the time of the merger in some embodiments. For instance, the $X_C$ sample values may include a larger number of samples that are not overrange values as compared to samples that are overrange values. Sampling in this more concentrated manner can enable the resulting 1D merged curve to cover a wide domain of inputs while limiting the storage space of the resulting merged curve. In one example, it may be desirable to generate and maintain a sampled merged curve that has 12-bit accuracy so as to maintain the accuracy of HDR color data when editing media that may be converted back to HDR color data.

At block 410, the process 400 involves mapping the input set of sample values to an intermediate set of sample values using the first 1D curve, more specifically, potentially using a variation of the first 1D curve. For instance, in the above example, if the first 1D curve, Curve A, is defined as $Y_A = f_A(X_A)$, then a variation of the first 1D curve is defined as $Y_A' = f_A'(X_A)$, the determination of which is described below.

In some embodiments, Curve A has x or y values within a limited range, e.g., in range of [0,1], and the media-processing application 110 extends that range when determining the resulting merged 1D curve. If Curve A is parametric, for instance, then Curve A is a chord in a limited range (e.g., a limited domain) of a larger parametric equation. In that case, to determine the variation of Curve A, $Y_A'$, an embodiment of the media-processing application 110 extends the parametric curve on one or more sides according to the parametric equation, to capture a wider range of values. The resulting function, including the original parametric curve along with its extensions on one or both sides, is used as $Y_A' = f_A'(X_A)$ in determining the merged 1D curve, Curve C, as described in more detail below. If Curve A is sampled, then Curve A is a 1D LUT mapping certain input entry values, i.e., $X_A = X_{A,1} \ldots X_{A,n}$, to corresponding outputs $Y_A = Y_{A,1} \ldots Y_{A,n}$. In some embodiments, the media-processing application 110 fits a parametric equation to this mapping. An example of a parametric equation to which Curve A can be fit is $Y_A = (\alpha X + \beta)^\gamma$, where the terms $\alpha$, $\beta$, and $\gamma$ are coefficients defining the shape of Curve A. The media-processing application 110 can extend the parametric equation past the original range of $X_A$ on either side to provide a wider range of values to which Curve A applies. The resulting function, including the original sampled curve along with its parametric extensions on one or both sides, is used as $Y_A' = f_A'(X_A)$ in determining the merged 1D curve, Curve C, as described in more detail below.

Using the above techniques at block 410 of the process 400, an embodiments of the media-processing application 110 determines $f_A'(X_C)$, which is an intermediate set of sample values and, further, which is the result of applying the variation of Curve A (i.e., with one or more parametric extensions) to the input set of sample values that were selected as inputs. If Curve A is a 1D LUT (i.e., a sampled curve), then the input set of sample values may include one or more values that are not input entry values in the 1D LUT that is Curve A. For each such sample value in the input set of sample values, an embodiment of the media-processing application 110 uses interpolation to determine a respective output of Curve A. For instance, given a sample value of s that is not an input entry value in the 1D LUT, the media-processing application 110 identifies input entry values r and t on either side of s and applies the 1D LUT to the input entry values r and t to determine corresponding outputs. The media-processing application 110 interpolates the respective output for the sample value s based on the corresponding outputs for r and t to determine and an output of Curve A, or the variation of Curve A, if applicable, as applied to the sample values. Thus, the media-processing application 110 is able to determine an intermediate set of sample values (i.e., outputs of the variation of the first 1D curve) given the input set of sample values and the variation of the first 1D curve.

At block 415, the process 400 involves mapping the intermediate set of sample values to an output set of sample values by using the second 1D curve, specifically, potentially using a variation of the second 1D curve with one or more parametric extensions. For instance, an embodiment the media-processing application 110 determines Curve C, $Y_C = f_B'(f_A'(X_C))$, by plugging the intermediate set of sample values, $f_A'(X_C)$, into a variation of Curve B, $f_B'( )$. As described above with respect to Curve A, an embodiment of the media-processing application 110 determines the variation of Curve B by adding one or more parametric extensions to Curve B. Further, if Curve B is a sampled 1D curve, then an embodiment of the media-processing application 110 uses interpolation as needed based on surrounding values to determine respective outputs of Curve B as applied to the intermediate set of sample values.

At block 420, the process 400 involves constructing a single merged 1D curve defined to map the input set of sample values to the output set of sample values. In some embodiments, the merged 1D curve is a sampled 1D curve (i.e., a 1D LUT) that maps the input set of sample values originally selected to the output set of sample values resulting from application of the first 1D curve, or a variation thereof as described above, and then the second 1D curve, or a variation thereof as described above. Thus, for instance, the media-processing application 110 generates, to act as the merged 1D curve, a 1D LUT utilizing the input set of sample values as input entry values and utilizing the output set of sample values as the outputs.

Thus, continuing the above example, to determine Curve C, $Y_C = f_B'(f_A'(X_C))$, the media-processing application 110 inputs each sample value of $X_C$ into $f_A'( )$ to determine a set of intermediate samples. In other words, Curve A is applied, utilizing the extension of Curve A as needed to ensure that each value of $X_C$ is in the domain of Curve A. The media-processing application 110 inputs each resulting intermediate sample into $f_B'( )$ to determine a set of output values. In other words, Curve B is applied, utilizing extensions of Curve B as needed to ensure that each intermediate sample is in the domain of Curve B. The media-processing application 110 uses the output values as output entries of $Y_C$. Thus, Curve C, the result of merging Curve A and Curve B maps inputs $X_C = X_{C,1} \ldots X_{C,m}$ (i.e., the selected sample values) to $Y_C = Y_{C,1} \ldots Y_{C,m}$, the outputs of applying Curve A and then Curve B.

For illustrative purposes, a merging process has been described above using an example involving two 1D curves. But other implementations are possible. For instance, merging can be applied to the following sets of operations, in which "1D(P)" refers to a parametric curve and "1D(S)" refers to a sampled curve, as well as others, to bring each such set of operations into the format {1D, Matrix, 1D}:
{1D(P), Matrix, 1D(P)}
{1D(P), Matrix, 1D(S)}
{1D(S), Matrix, 1D(P)}
{1D(S), Matrix, 1D(S)}
{1D(P), 1D(P), Matrix, 1D(P), 1D(P)}
{1D(P), 1D(P), Matrix, 1D(P)}
{1D (P), Matrix, 1D(P), 1D(P)}
{1D(S), 1D(S), Matrix, 1D(S), 1D(S)}

As noted above, parametric extensions may be used in some embodiments during a process of merging two curves. In particular, the use of parametric extensions is useful when a color transform of which the two curves are a part involves overrange values. For instance, as mentioned above, media content might be transformed from an HDR color space into a working color space to enable a user to more accurately view edits to the media content. However, the HDR color space may include a wider range of values than does the working color space. If a color value of media content is converted to a color value outside of the range of the working color space, then that converted color value is sometimes stored as an overrange value. During editing, a change to the media content might be converted from the working color space to a display color space corresponding to a display monitor to enable a user to see the change while editing. After the user is finished editing, the media-processing system might convert the media content back to the original HDR color space, including converting the overrange color data back to HDR color data. However, while color data of the media content is in the working color space or the display color space, the color data may include overrange values (i.e., values outside the range of a current color space), which are retained to enable the color data to eventually be transformed back to the HDR color space without a loss of information. Thus, even when performing a color transform between color spaces where neither of such color spaces is an HDR color space, an embodiment of the media-processing application 110 is configured to handle overrange values.

In a particular color space, the normalized range of values in each channel can typically be represented as [0, 1] inclusive, or in a broader range such as in the case of HDR color data. For example, a range of available "red" color values from $x_{min}$ to $x_{max}$ in one color space could be normalized to the range [0, 1], and a range of available "red" color values from $y_{min}$ to $y_{max}$ in a different color space could be normalized to the range [0, 1], with 1 computed by normalizing $y_{max}$. Thus, when color data being processed has a value outside the applicable range (e.g., 1.1 in a color space normalized to the range [0, 1]), an embodiment of the media-processing application 110 is configured to process that color data to retain the overrange information. In some cases, a 1D curve indicated in a color profile will be limited to a range of [0, 1]. For instance, in the case of a sampled curve, the x values are in the range of [0, 1]. However, the media-processing application 110 extends this range of x values to include potential overrange values that are less than 0 or greater than 1 as needed. In the case of a parametric curve, the color profile may indicate a chord (i.e., a segment of the parametric curve) having x values in the range of [0, 1], and in that case the media-processing application 110 extends that parametric curve based on the parametric equation defining the parametric curve.

The media-processing application 110 can improve the performance of a color-transform operation using a merged 1D curve as compared to using separate 1D curves. For example, a merged 1D curve may require a single interpolation step to use, which is more economical than performing two separate interpolation steps with respect to two separate 1D curves.

Returning to FIG. 3, block 320 of that process 300 of transforming color data involves determining, during the runtime, that a static shader 130 compiled during initialization (i.e., at block 305) is applicable to the color transform from the pre-transform color space to the post-transform color space that is determined at block 310 (and, where applicable, modified via one or more mergers at block 315). In some embodiments, the media-processing application 110 selects an appropriate static shader 130 from among those that were precompiled and are thus available for use without the need to be compiled during runtime.

As described above, each static shader represents a format defining a sequence of operation types (e.g., 1D curves, 3D LUTs, matrices). To determine which static shader to use, an embodiment of the media-processing application 110 compares that sequence of operations in the color transform (i.e., from block 310 and, where applicable, block 315) to the sequence of operations types embodied by the static shaders (i.e., the static shaders compiled at block 305). If the comparison indicates that a particular static shader matches a format of the sequence of operations (i.e., the sequence of operation types of the static shader 130 match the operations types in the sequence of operations), the media-processing application 110 selects that static shader.

Block 325 of the process 300 involves executing the static shader 130 to perform the color transform, based on determining that the static shader is applicable to the color transform. In some embodiments, the media-processing application 110 executes the static shader 130 selected for use above. More specifically, to execute the static shader 130, the media-processing application 110 converts each operation in the sequence of operations into a corresponding texture or a corresponding buffer. Typically, the term "texture" refers to the appearance of a graphical object, and textures are processed by GPUs to provide views of an objects with appearances provided in textures. However, embodiments described herein store operations as textures to enable a static shader 130 to utilize such operations.

An example of a static shader 130 has a predefined number of arguments, including arguments representing the operation types of the static shader 130. Each argument could be, for instance, a texture, a buffer, or a uniform variable. Some embodiments utilize textures to represent LUTs (e.g., 1D curves or 3D LUTs) and buffers to represent matrices, such that, for instance, a LUT is converted into a texture and the static shader 130 is bound to that texture to utilize the texture, and thus the LUT, as an argument, or such that a matrix is converted into a buffer and the static shader 130 is bound to the buffer to utilize the buffer, and thus the matrix, as an argument. In one example, a processing unit of the computing system 201 provides each such LUT or matrix to the GPU 140 by way of an application programming interface provided by a GPU framework, such as Metal, DX12, or Vulcan, for instance, which loads the each such LUT or matrix onto a texture or buffer, respectively.

In some embodiments, the media-processing application 110 binds the static shader 130 to the set of corresponding textures or buffers, or both, each texture or buffer representing a respective operation or respective merged operations in the sequence of operations of the color transform. The act of binding an asset to a texture or buffer is known in the art. For instance, various programming languages provide binding commands, and thus, in some embodiments, implementation of binding a static shader 130 to a texture involves coding appropriate commands in the programming language used to code the media-processing application 110. The binding causes the GPU to update the pipeline state 245 of the static shader 130 in the GPU 140. The media-processing application 110 then passes one or more commands to the GPU 140, where such commands provide the color data to be transformed. As a result, the GPU 140 processes the color transform to transform color data in the media from the pre-transform color space to the post-transform color space.

Examples of Specific Static Shaders Used for Color Transforms

In some embodiments, compiling static shaders at initialization (e.g., in block 305 of process 300) involves compiling one or more of the following static shaders: a first static shader 130a for a general transform, a second static shader 130b for a simple matrix transform, a third static shader 130c for a hybrid-input transform, and a fourth static shader 130d for a hybrid-output transform. Examples of each of these static shaders 130 are described below in detail.

The first static shader 130a includes the set of ten operation types described above that represent a typical transform from one RGB color space to another RGB color space. The first static shader 130a is useable for general transforms in that the first static shader 130a is an encoding of operations types rather than specific operations and thus acts as a template for this sequence of ten operations. The first static shader 130a is profile-agnostic in that the specific ten operations needed for a particular transform are not encoded in the static shader 130. Rather, an example of the first static shader 130a is implemented with ten dependencies and is thus configured to be bound to ten textures, each texture representing an operation of the ten operations.

Recalling from above, an example of a static shader 130 has a format of the following three operation types in sequence: a first 1D curve, a matrix, and a second 1D curve. Thus, this static shader 130 includes machine-readable instructions that tell the GPU 140 to perform the following operations on each three-dimensional color coordinate in a given media content: (1) receive the color coordinate; (2) for each of the three channels of the color coordinate, map the value of the color coordinate in that channel to a corresponding value using a first one-dimensional mapping that will be provided; (3) store the results of the first one-dimensional mappings of the three channels to a second color coordinate; (4) use matrix multiplication to multiply the second color coordinate by a matrix that will be provided; (5) store the result of the matrix multiplication to a third color coordinate; (6) for each of the three channels, map the value of the third color coordinate in that channel to a corresponding value using a second one-dimensional mapping that will be provided; and (7) output the results of the second one-dimensional mapping of the three channels as a fourth color coordinate. The static shader 130 remains profile-agnostic because the static shader 130 does not explicitly specify the first 1D curve, the matrix, or the second 1D curve; rather, the static shader expects parameters that specifically define the first 1D curve, the matrix, and the second 1D curve. In other words, this example static shader 130 has three dependencies in that the static shader 130 can be bound to a corresponding texture representing each of the three operations (i.e., the first 1D curve, the matrix, and the second 1D curve) to run.

Analogously, the first static shader 130a includes ten operation types and thus has ten dependencies. The media-processing application 110 seeks to bind the first static shader 110 to ten specific operations matching the operation types of the first static shader 130a.

To utilize the first static shader 130a during runtime to transform from a pre-transform color space to a post-transform color space, an embodiment of the media-processing application 110 determines the specific operations needed to perform the color transform. To this end, the media-processing application 110 checks the corresponding color profiles of the pre-transform color space and the post-transform color space to determine the specific ten operations (e.g., the specific parametric curve to use as the 1D curve in the first operation) needed to convert from the pre-transform color space to the post-transform color space. The media-processing application 110 then binds the first static shader 130a to textures representing these operations. If a particular operation of the ten operation types is not needed (i.e., as indicated in a color profile), however, the media-processing application generates a texture representing a no-op and binds the static shader 110 to such texture in place of the operation that is not needed.

As described above, an embodiment of the media-processing application 110 is configured to merge adjacent 1D curves together and to merge adjacent matrices together. Additionally or alternatively to compiling the above first static shader 130a at initialization, the media-processing application 110 generates a variation of the first static shader 130a by merging certain operation types of the ten operation types in the first static shader 130a. For instance, the sequence of ten operation types {1D, 3D, 1D, Matrix, 1D, 1D, Matrix, 1D, 3D, 1D} identified above can be implemented using a variation of a static shader 130 having nine operation types. In this example, the middle two 1D curves are merged. This results in a variation of the first static shader 130a having the following nine operations: {1D, 3D, 1D, Matrix, 1D, Matrix, 1D, 3D, 1D}. As described above with respect to mergers, merging enables a single 1D curve to be used in place of two adjacent 1D curves. Thus, to utilize this version of the first static shader 130a, the media-processing application 110 would determine the ten operations needed to perform a color transform, i.e., by checking the appropriate color profiles. The media-processing application 110 would merge the two central 1D curves of the ten operations for the color transform, resulting in a total of nine operations. The media-processing application 110 would then convert each of the nine operations to textures and bind the first static shader 130a to the resulting nine textures. The media-processing application 110 would then instruct the GPU 140 to process media content utilizing the first static shader 130a.

Thus, in some embodiments, one of the static shaders 130 that is precompiled (e.g., compiled during initialization), specifically the first static shader 130a, has nine dependencies enabling the static shader 130 to be bound to these nine operations of a general color transform between RGB spaces.

Additionally or alternatively, the conversion system 100 includes program code to compile a second static shader 130b representing, and acting as a template for, a simple matrix transform. Although the first static shader 130a described above can be used for all RGB color transforms in some embodiments, it may be more efficient to utilize a more tailored static shader 130 for simple color transforms (i.e., color transforms requiring a small number of operations). The second static shader 130b represents simple matrix transforms in the format {1D, Matrix, 1D}. As described above, due to possible mergers, the matrix bound to the second static shader 130b could be a merged matrix, and each 1D curve could be a merged 1D curve. For instance, this second static shader 130b is applicable if the transform from a pre-transform color space to a post-transform color space takes one of the following formats: {1D, 1D, Matrix, Matrix, 1D}, {1D, 1D, Matrix, Matrix, 1D, 1D}, {1D, Matrix, Matrix, 1D, 1D}, or {1D, Matrix, Matrix, 1D}. If a desired color transform takes one of these formats, during runtime, an embodiment of the media-processing application 110 performs any possible mergers, such as by merging each pair of adjacent 1D curves in the sequence of operations needed for the color transform. The media-processing application 110 converts each operation, after mergers, into a corresponding texture. The media-processing application 110 binds the second static shader 130b to each such texture. The media-processing application 110 then instructs the GPU 140 to utilize the second static shader 130b to process media content to, thereby, perform the color transform on the media content.

It will be recognized that the formats to which the second static shader 130b is applicable are a subset of the more complex format of the ten operations described above, with certain operations replaced by no-ops. In one example, given a color transform requiring a first 1D curve, a matrix, and a second 1D curve, in that order, this color transform could be processed utilizing the first static shader having nine operation types. However, no-ops would be used to replace six of such operation types, because only three operations are needed in this example. The second static shader 130b can also be used to process this color transform because the second static shader 130b is designed to handle color transforms having the exact format of the color transform. Thus, in some embodiments, the first static shader 130a is useable for each potential transform between RGB color spaces. However, it may be more efficient to utilize a less complex static shader 130, such as the second static shader 130b, for transforms that can be represented by the second static shader 130b.

Additionally or alternatively, the conversion system 100 includes program code to compile a third static shader 130c representing a hybrid-input matrix transform. The third static shader 130c represents hybrid-input matrix transforms in the format {1D, 3D, 1D, Matrix, 1D}. As described above, due to possible mergers, the matrix bound to the third static shader 130c could be a merged matrix, and each 1D curve could be a merged 1D curve. For instance, this third static shader 130c is applicable when the color transform from a pre-transform color space to a post-transform color space takes one of the following formats: {1D, 3D, 1D, Matrix, Matrix, 1D} or {1D, 3D, 1D, Matrix, Matrix, 1D, 1D}. Each of such formats can become {1D, 3D, 1D, Matrix, 1D} after the performance of mergers.

In one example, during runtime, the media-processing application 110 seeks to perform a color transform from a pre-transform color space to a post-transform color space. The media-processing application 110 checks the corresponding color profiles and thus determines the specific sequence of operations needed to perform the color transform. Further, the media-processing application 110 performs applicable mergers to merge adjacent 1D curves and to merge adjacent matrices in the sequence of operations. The media-processing application 110 then determines that the operation types of the sequence of operations, after such mergers, if any, has a format of {1D, 3D, 1D, Matrix, 1D}. Because this is the format of the third static shader 130c, the media-processing application 110 determines that the third static shader 130c applies and, thus, can be used to process the color transform. The media-processing application 110 therefore binds the third static shader 130c to the following: a texture representing a first 1D curve determined based on the pre-transform color profile; a texture representing a 3D LUT determined based on the pre-transform color profile; a texture representing a second 1D curve determined based on the pre-transform color profile; a texture representing a matrix that is the result of merging matrices determined from the pre-transform color profile and the post-transform color profile; and a texture representing a 1D curve determined based on the post-transform color profile, where that 1D curve may be a merged result of other 1D curves determined from the post-transform color profile.

As with the second static shader 130b, it will be recognized that the formats to which the third static shader 130c is applicable are a subset of the more complex format of the ten operations described above. Thus, in some embodiments, the first static shader is useable for each potential transform between RGB color spaces. However, it may be more efficient to utilize a less complex static shader 130, such as the third static shader 130c, for transforms that can be represented by the third static shader 130c.

Additionally or alternatively, the conversion system 100 includes program code to compile a fourth static shader 130d representing a hybrid-output matrix transform. The fourth static shader 130d represents hybrid-output matrix transforms in the format {1D, Matrix, 1D, 3D, 1D}. As described above, due to possible mergers, the matrix bound to the fourth static shader 130d could be a merged matrix, and each 1D curve could be a merged 1D curve. For instance, this fourth static shader 130d is applicable when the color transform from a pre-transform color space to a post-transform color space takes one of the following formats: {1D, Matrix, Matrix, 1D, 3D, 1D} or {1D, 1D, Matrix, Matrix, 1D, 3D, 1D}. Each of such formats can become {1D, Matrix, 1D, 3D, 1D} after the performance of mergers.

In one example, during runtime, the media-processing application 110 seeks to perform a color transform from a pre-transform color space to a post-transform color space. The media-processing application 110 checks the corresponding color profiles and thus determines the specific sequence of operations needed to perform the color transform. Further, the media-processing application 110 performs applicable mergers to merge adjacent 1D curves and to merge adjacent matrices in the sequence of operations. The media-processing application 110 then determines that the operation types of the sequence of operations, after such mergers, if any, has a format of {1D, Matrix, 1D, 3D, 1D}. Because this is the format of the fourth static shader 130d, the media-processing application 110 determines that the fourth static shader 130d applies and, thus, can be used to process the color transform. The media-processing application 110 therefore binds the fourth static shader 130d to the following: a texture representing a 1D curve determined based on the pre-transform color profile, where that 1D curve may be a merged result of other 1D curves determined from the pre-transform color profile; a texture representing a matrix that is the result of merging matrices determined from the pre-transform color profile and the post-transform color profile; a texture representing a first 1D curve determined based on the port-transform color profile; a texture representing a 3D LUT determined based on the post-transform color profile; and a texture representing a second 1D curve determined based on the post-transform color profile.

As with the second and third static shaders 130, it will be recognized that the formats to which the fourth static shader 130d is applicable are a subset of the more complex format of ten operations. Thus, in some embodiments, the first static shader is useable for each potential transform between RGB color spaces. However, it may be more efficient to utilize a less complex static shader 130, such as the fourth static shader 130d, for transforms that can be represented by the fourth static shader 130d.

The different static shaders can be used to implement blocks 320 and 325 of the process 300. For example, four static shaders 130 can be compiled at block 305 and available for use at block 320 without requiring compilation at runtime. Specifically, in one example, the precompiled static shaders 130 include a first static shader 130a for general transforms, a second static shader 130b for simple matrix transforms, a third static shader 130c for hybrid-input matrix transforms, and a fourth static shader 130d for hybrid-output matrix transforms. In another example, however, only a subset of these static shaders 130 were precompiled and available without requiring compilation at runtime, or the set of precompiled static shaders 130 includes static shaders 130 that differ from those described above.

As described above, the first static shader 130a represents a format of a general transform and, in some embodiments, is applicable to all transformations between RGB color spaces. However, due to the complexity involved in binding the first static shader 130a to nine operations, some of which could be no-ops, the media-processing application 110 gives preference to the other static shaders 130 over the first static shader 130a. However, if none of the other static shaders 130 matches the sequence of operations needed for the color transform, then an embodiments of the media-processing application 110 selects the first static shader 130a for use in the color transform.

Example of Computing System Used to Perform Color Transforms

Figure 5:
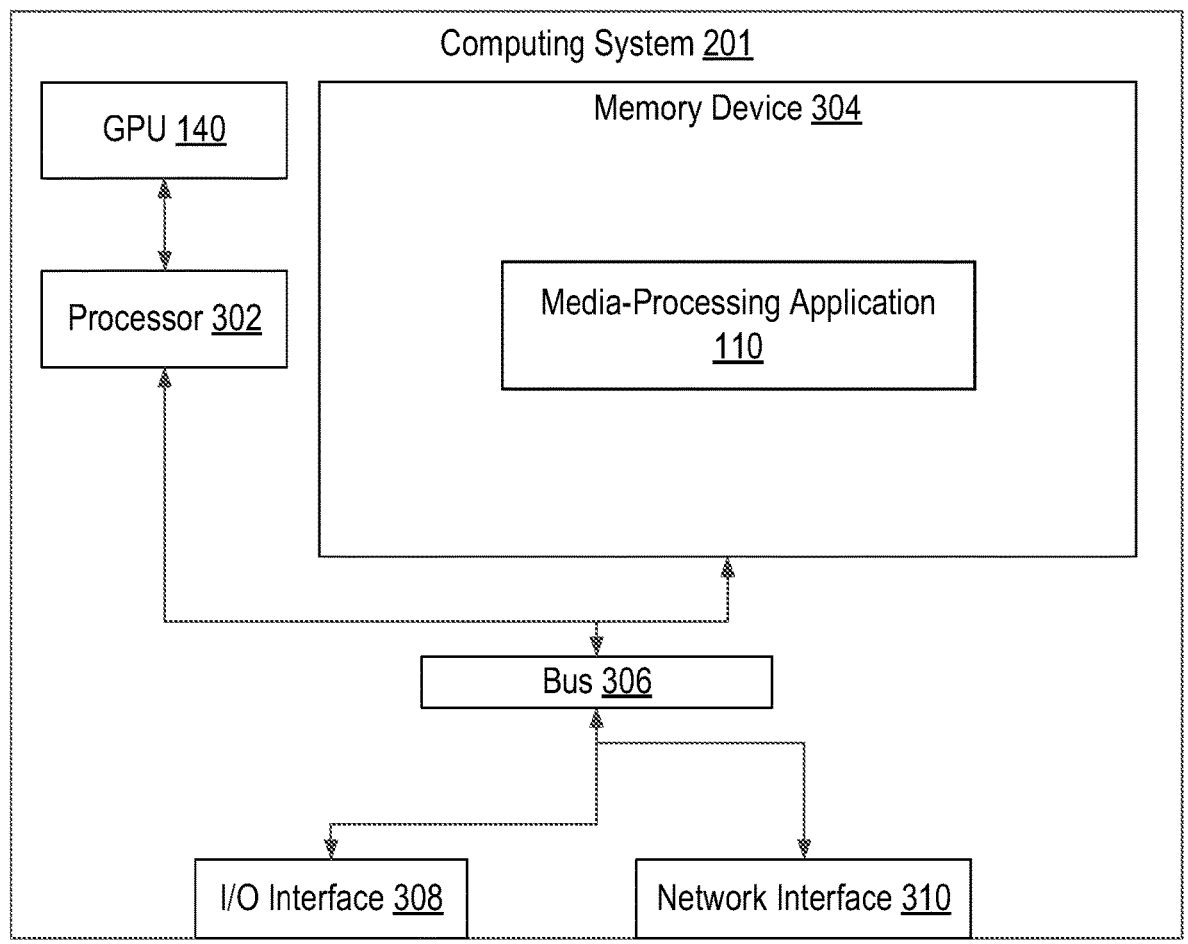
FIG. 5 depicts an example of a computing system that performs certain operations described herein, according to certain embodiments of the present disclosure.

FIG. 5 depicts an example of the computing system 201 that performs certain operations described herein, according to certain embodiments of the present disclosure. Any suitable computing system or group of computing systems can be used for performing the operations described herein. For example, FIG. 5 depicts an example of a computing system 201 that includes a GPU 140 and executes a media-processing application 110. In other embodiments, a separate computing system having devices similar to those depicted in FIG. 5 (e.g., a processor, a memory, etc.) executes the media-processing application 110, and the computing system 201 of FIG. 5 accesses the media-processing application 110 remotely.

The depicted example of a computing system 201 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing data (e.g., color data or media content described above with respect to FIGS. 1-3), program code (e.g., a media processing application and/or static shaders), or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 201 may also include a number of external or internal devices, such as input or output devices. For example, the computing system 201 is shown with one or more input/output ("I/O") interfaces 508. An I/O interface 508 can receive input from input devices or provide output to output devices. One or more buses 506 are also included in the computing system 201. The bus 506 communicatively couples one or more components of a respective one of the computing system 201.

The computing system 201 executes program code that configures the processor 502 to perform one or more of the operations described herein. The program code includes, for example, the media-processing application 110 or other suitable applications that perform one or more operations described herein. The program code may be resident in the memory device 504 or any suitable computer-readable medium and may be executed by the processor 502 or any other suitable processor. In additional or alternative embodiments, the program code is stored in one or more other memory devices accessible via a data network.

The computing system 201 also includes a network interface device 510. The network interface device 510 includes any device or group of devices suitable for establishing a wired or wireless data connection to one or more data networks. Non-limiting examples of the network interface device 510 include an Ethernet network adapter, a modem, and the like. The computing system 201 is able to communicate with one or more other computing devices (e.g., a computing device executing all or a portion of the media-processing application 110) via a data network using the network interface device 510.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method in which one or more processing devices perform operations comprising:
    compiling, at initialization of a media-processing application, a static shader configured to transform color data from multiple pre-transform color spaces to multiple post-transform color spaces;
    receiving, during a runtime of the media-processing application, a request to perform a color transform from a pre-transform color space to a post-transform color space, wherein the runtime occurs subsequent to the initialization;
    tailoring the static shader to convert from the pre-transform color space to the post-transform color space, wherein tailoring the static shader comprises:
        identifying a sequence of operation types encoded in the static shader;
        determining that the static shader is applicable to the color transform, based on a sequence of operation types encoded in the static shader matching a mapping from the pre-transform color space to the post-transform color space;
        identifying a specific operation needed to map from the pre-transform color space to the post-transform color space, wherein the specific operation corresponds an operation type in the sequence of operation types encoded in the static shader;
        constructing an operation texture to represent the specific operation; and
        binding the static shader to the operation texture representing the specific operation needed to map from the pre-transform color space to the post-transform color space; and
    executing the static shader to perform the color transform.

2. The method of claim 1, wherein determining that the sequence of operation types encoded in the static shader matches a mapping from the pre-transform color space and the post-transform color space comprises:
    extracting from the pre-transform color space an indication of one or more operations to convert the pre-transform color space to a device-independent color space, the one or more operations comprising a first one-dimensional mapping and a second one-dimensional mapping; and
    merging the first one-dimensional mapping and the second one-dimensional mapping into a single one-dimensional mapping.

3. The method of claim 1, the operations further comprising:
    during initialization, storing the static shader in a pipeline state of a graphics processing unit; and
    instructing the graphics processing unit, during the runtime, to process the color transform in the pipeline state.

4. The method of claim 3, wherein the pipeline state of the graphics processing unit is established during the initialization and prior to the runtime.

5. The method of claim 1, the operations further comprising:
    determining, during an additional runtime of the media-processing application, that the static shader is applicable to an additional color transform from an additional pre-transform color space to an additional post-transform color space,
    wherein the static shader is pre-compiled prior to the additional runtime, and
    wherein the additional post-transform color space is distinct from the post-transform color space; and
    executing the static shader to perform the additional color transform, based on determining that the static shader is applicable to the additional color transform.

6. The method of claim 1, wherein the static shader is configured to transform between pairs of multiple Red-Green-Blue color spaces.

7. The method of claim 1, wherein the static shader is configured to be bound to textures representing specific operations of multiple color profiles.

8. A non-transitory computer-readable medium embodying program code for transforming between color spaces, the program code comprising instructions that, when executed by a processor, cause the processor to perform operations comprising:
    compiling, at initialization of a media-processing application, a static shader configured to transform color data from multiple pre-transform color spaces to multiple post-transform color spaces;
    receiving, during a runtime of the media-processing application, a request to perform a color transform from a pre-transform color space to a post-transform color space, wherein the runtime occurs subsequent to the initialization;
    tailoring the static shader to convert from the pre-transform color space to the post-transform color space, wherein tailoring the static shader comprises:

identifying a sequence of operation types encoded in the static shader;

determining that the static shader is applicable to the color transform, based on a sequence of operation types encoded in the static shader matching a mapping from the pre-transform color space to the post-transform color space;

identifying a specific operation needed to map from the pre-transform color space to the post-transform color space, wherein the specific operation corresponds an operation type in the sequence of operation types encoded in the static shader;

constructing an operation texture to represent the specific operation; and binding the static shader to the operation texture representing the specific operation needed to map from the pre-transform color space to the post-transform color space; and executing the static shader to perform the color transform.

9. The non-transitory computer-readable medium of claim 8, wherein determining that the sequence of operation types encoded in the static shader matches a mapping from the pre-transform color space and the post-transform color space comprises:

extracting from the pre-transform color space an indication of one or more operations to convert the pre-transform color space to a device-independent color space, the one or more operations comprising a first one-dimensional mapping and a second one-dimensional mapping; and merging the first one-dimensional mapping and the second one-dimensional mapping into a single one-dimensional mapping.

10. The non-transitory computer-readable medium of claim 8, the operations further comprising:

during initialization, storing the static shader in a pipeline state of a graphics processing unit; and instructing the graphics processing unit, during the runtime, to process the color transform in the pipeline state.

11. The non-transitory computer-readable medium of claim 10, wherein the pipeline state of the graphics processing unit is established during the initialization and prior to the runtime.

12. The non-transitory computer-readable medium of claim 8, the operations further comprising:

determining, during an additional runtime of the media-processing application, that the static shader is applicable to an additional color transform from an additional pre-transform color space to an additional post-transform color space, wherein the static shader is pre-compiled prior to the additional runtime, and wherein the additional post-transform color space is distinct from the post-transform color space; and executing the static shader to perform the additional color transform, based on determining that the static shader is applicable to the additional color transform.

13. The non-transitory computer-readable medium of claim 8, wherein the static shader is configured to transform between pairs of multiple Red-Green-Blue color spaces.

14. The non-transitory computer-readable medium of claim 8, wherein the static shader is configured to be bound to textures representing specific operations of multiple color profiles.

15. A method in which one or more processing devices perform operations comprising:

compiling, at initialization of a media-processing application, multiple static shaders configured to transform color data from multiple pre-transform color spaces to multiple post-transform color spaces, wherein the multiple static shaders are compiled prior to a runtime of the media-processing application, wherein a first static shader of the multiple static shaders encodes a first sequence of operation types for mapping from two or more pre-transform color spaces to two or more post-transform color spaces, and wherein a second static shader of the multiple static shaders encodes a second sequence of operation types for mapping from an additional two or more pre-transform color spaces to an additional two or more post-transform color spaces;

receiving, during the runtime of the media-processing application, a request for a color transform from a pre-transform color space to a post-transform color space;

selecting an applicable static shader, from among the multiple static shaders, to use for the color transform, wherein selecting the applicable static shader comprises:

determining that the first static shader is not applicable to the color transform, based on the first sequence of operation types encoded in the first static shader not matching a mapping from the pre-transform color space to the post-transform color space;

determining that the second static shader is applicable to the color transform, based on the second sequence of operation types encoded in the second static shader matching the mapping from the pre-transform color space to the post-transform color space; and selecting the second static shader as the applicable static shader;

identifying a specific operation needed to map from the pre-transform color space to the post-transform color space, wherein the specific operation corresponds an operation type in the second sequence of operation types encoded in the second static shader;

constructing an operation texture to represent the specific operation;

binding the second static shader to the operation texture representing the specific operation needed to map from the pre-transform color space to the post-transform color space; and executing the first static shader on a graphics processing unit to perform the color transform.

16. The method of claim 15, the operations further comprising, during the initialization, associating the first static shader with a pipeline state of the graphics processing unit.

17. The method of claim 16, wherein executing the first static shader to perform the color transform comprises processing the color transform in the pipeline state with which the first static shader was associated during the initialization.

18. The method of claim 15, wherein the multiple static shaders are together configured to represent each color transform between Red-Green-Blue color spaces supported by the media-processing application.

* * * * *